United States Patent
Nikolai et al.

(10) Patent No.: US 10,740,457 B2
(45) Date of Patent: Aug. 11, 2020

(54) SYSTEM FOR PREVENTING MALICIOUS OPERATOR PLACEMENT IN STREAMING APPLICATIONS

(71) Applicant: International Business Machines Corporation, Armonk, NY (US)

(72) Inventors: Jason A. Nikolai, Rochester, MN (US); John M. Santosuosso, Rochester, MN (US); David M. Koster, Rochester, MN (US); Alexander Cook, London (GB)

(73) Assignee: International Business Machines Corporation, Armonk, NY (US)

( * ) Notice: Subject to any disclaimer, the term of this patent is extended or adjusted under 35 U.S.C. 154(b) by 232 days.

(21) Appl. No.: 16/013,796

(22) Filed: Jun. 20, 2018

(65) Prior Publication Data
US 2019/0392139 A1 Dec. 26, 2019

(51) Int. Cl.
*H04L 29/06* (2006.01)
*G06F 21/55* (2013.01)

(52) U.S. Cl.
CPC .......... *G06F 21/552* (2013.01); *G06F 21/554* (2013.01); *G06F 2221/033* (2013.01)

(58) Field of Classification Search
CPC .................................................... G06F 21/552
See application file for complete search history.

(56) References Cited

U.S. PATENT DOCUMENTS

| | | | |
|---|---|---|---|
| 8,131,838 B2 | 3/2012 | Bornhoevd et al. | |
| 9,485,265 B1 | 11/2016 | Saperstein et al. | |
| 2009/0024622 A1* | 1/2009 | Chkodrov | G06F 16/24568 |
| 2012/0066166 A1 | 3/2012 | Curbera et al. | |
| 2015/0254094 A1* | 9/2015 | Cao | G06F 16/24568 718/1 |
| 2016/0098561 A1 | 4/2016 | Keller et al. | |

(Continued)

OTHER PUBLICATIONS

"Streaming Analytics", retrieved from http://www-01.ibm.com/software/data/infosphere/stream-computing/, Apr. 2018.

(Continued)

*Primary Examiner* — Shawnchoy Rahman
(74) *Attorney, Agent, or Firm* — North Shore Patents, P.C.; Michele Liu Baillie

(57) ABSTRACT

In preventing malicious operator placement in a streaming application, a stream computing management system receives a submission of an operator graph for the streaming application. A scheduler of the stream computing management system places the operators across a plurality of computing nodes. A threat detector of the stream computing management system monitors placements of the operators during the submission of the operator graph and a runtime of the streaming application. The threat detector further monitors runtime activities of the operators of the streaming application. The threat detector compares the runtime activities of the operators of the streaming application with stored activities patterns. The threat detector determines whether any anomalies identified based on the comparing exceeds a risk tolerance threshold. In response to an anomaly exceeding the risk tolerance threshold, the scheduler changes a placement of at least one of the operators.

18 Claims, 7 Drawing Sheets

(56) References Cited

U.S. PATENT DOCUMENTS

| | | | |
|---|---|---|---|
| 2016/0171102 A1 | 6/2016 | Pandya | |
| 2016/0212159 A1* | 7/2016 | Gupta | G06F 21/566 |
| 2016/0308884 A1* | 10/2016 | Kent | G06K 9/6277 |
| 2018/0253340 A1* | 9/2018 | Barsness | G06F 8/433 |

OTHER PUBLICATIONS

Bellavista, Paolo et al., "Priority-based Resource Scheduling in Distributed Stream Processing Systems for Big Data Applications", 2014 IEEE/ACM 7th International Conference on Utility and Cloud Computing, 2014.

Djahel et al., "Adaptive traffic management for secure and efficient emergency services in smart cities," Proc. of the IEEE 2013 PerCom Conference. San Diego, CA, USA: IEEE, 2013, pp. 340-343.

Garofalakis, "Distributed data streams" in Encyclopedia of Database Systems, 2009, Springer.

Hirzel et al., "SPL: An Extensible Language for Distributed Stream Processing", IBM Research Report RC25486 (WAT1407-055) Jul. 30, 2014.

Idika et al, "A Survey of Malware Detection Techniques", Department of Computer Science, Purdue University, West Lafayette, IN, 2007.

Schales et al., "Stream Computing for Large-Scale, Multi-Channel Cyber Threat Analytics," IEEE IRI 2014, Aug. 13-15, 2014.

Xie et al., "pBMDS: A Behavior-based Malware Detection System for Cellphone Devices", Proceedings of the 3rd ACM conference onWireless Network Security, WiSec '10, 2010.

\* cited by examiner

SYSTEM FOR PREVENTING MALICIOUS OPERATOR PLACEMENT IN STREAMING APPLICATIONS

BACKGROUND

Streaming applications are known in the art, and typically include multiple operators, or software analytic modules, coupled together in an operator graph that process data in near real-time. The operators are placed across multiple hosts, or nodes, in a distributed or cloud computing environment. The placement of the operators can be both user and runtime configurable. Typically, the placement of operators is done based on performance or resource requirements. A particular placement of an operator may involve potential security risks, such as in multi-tenant cloud deployments where multiple customers may share the same node, which may result in malicious operator placement configurations. These potential security risks, however, are not part of the conventional placement of operators done based on performance or resource requirements.

SUMMARY

Disclosed herein is a method for preventing malicious operator placement in streaming applications, and a computer program product and system as specified in the independent claims. Embodiments of the present invention are given in the dependent claims. Embodiments of the present invention can be freely combined with each other if they are not mutually exclusive.

According to an embodiment of the present invention, in preventing malicious operator placement in a streaming application, a stream computing management system receives a submission of an operator graph for the streaming application. The operator graph includes a plurality of operators. A scheduler of the stream computing management system places the plurality of operators across a plurality of computing nodes. A threat detector of the stream computing management system monitors placements of the plurality of operators during the submission of the operator graph and a runtime of the streaming application. The threat detector further monitors runtime activities of the plurality of operators of the streaming application. The threat detector compares the runtime activities of the plurality of operators of the streaming application with stored activities patterns. The threat detector determines whether any anomalies identified based on the comparing exceeds a risk tolerance threshold. In response to determining that an anomaly identified based on the comparing exceeds the risk tolerance threshold, the scheduler changes a placement of at least one operator of the plurality of operators.

DETAILED DESCRIPTION

Figure 1:
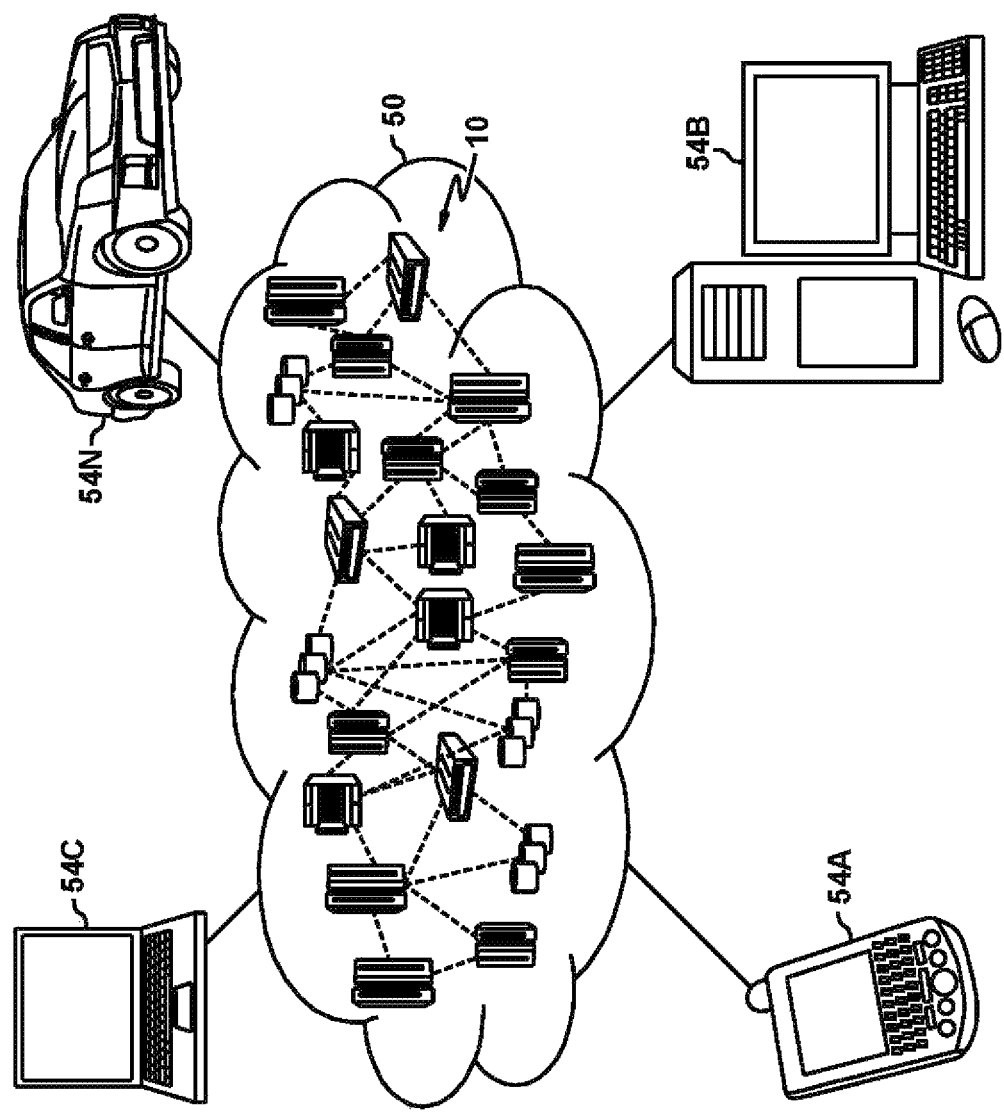
FIG. 1 depicts a cloud computing environment according to an embodiment of the present invention.

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Referring now to FIG. 1, illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 1 are intended to be illustrative only and that computing nodes 10 and cloud computing environment 50 can communicate with any type of computerized device over any type of network and/or network addressable connection (e.g., using a web browser).

Figure 2:
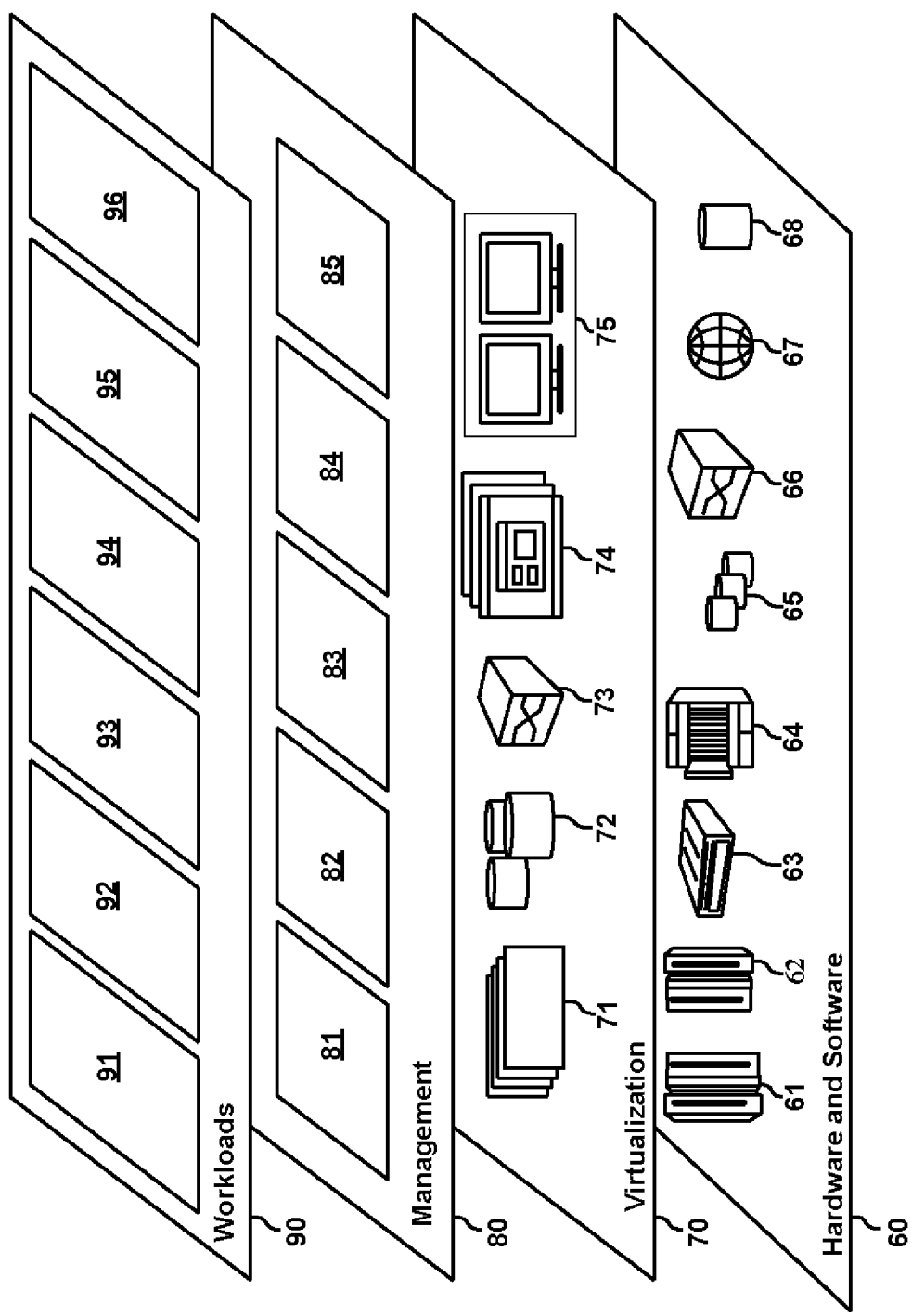
FIG. 2 depicts abstraction model layers according to an embodiment of the present invention.

Referring now to FIG. 2, a set of functional abstraction layers provided by cloud computing environment 50 (FIG. 1) is shown. It should be understood in advance that the components, layers, and functions shown in FIG. 2 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and the processing of stream data 96 via streaming applications.

Figure 3:
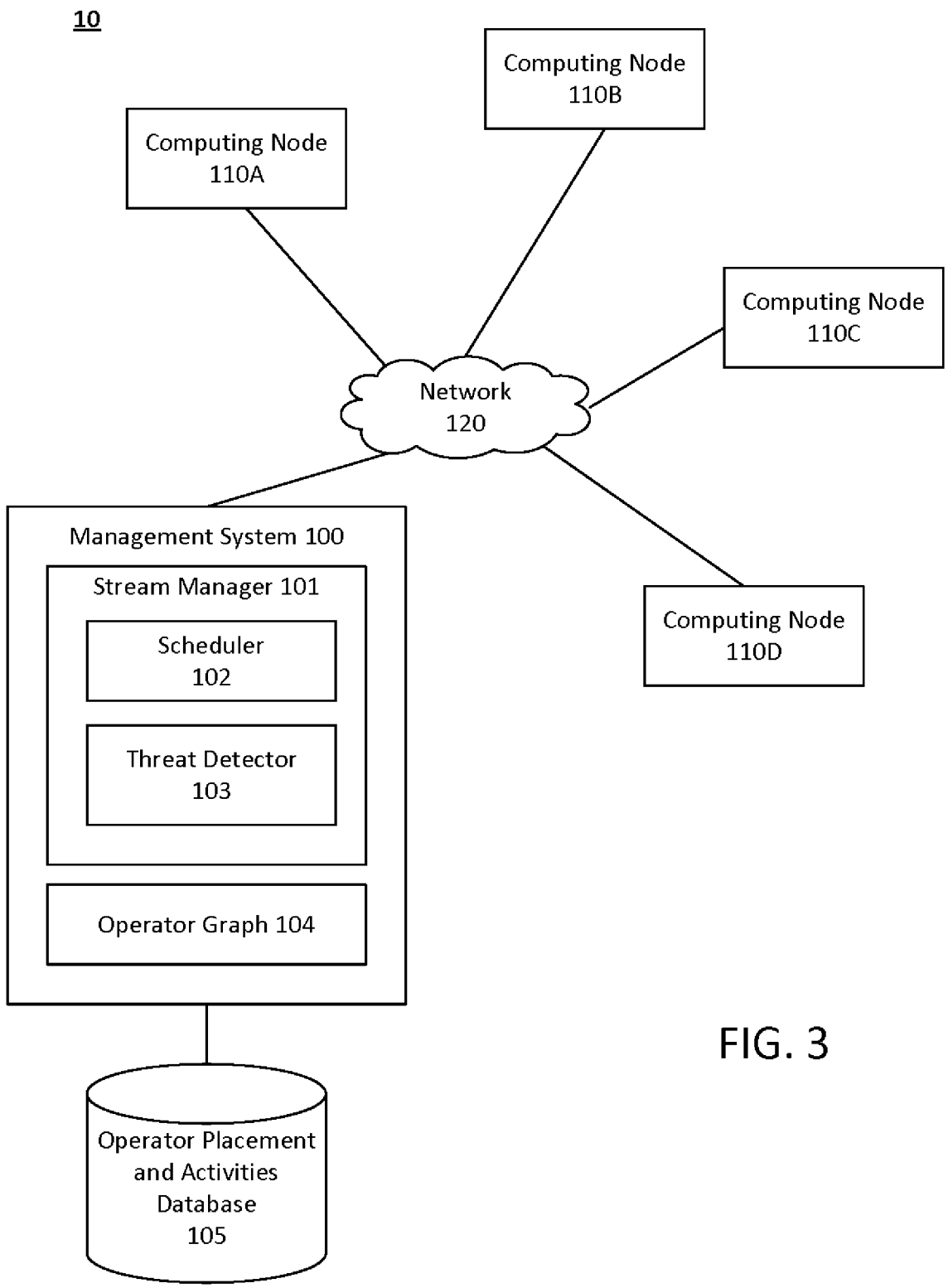
FIG. 3 illustrates an exemplary stream computing environment, according to some embodiments, configured to execute a streaming application.

FIG. 3 illustrates an exemplary stream computing environment, according to some embodiments, configured to execute a streaming application. The stream computing environment 10 includes a management system 100, which includes a stream manager 101, which includes a scheduler 102 and a threat detector 103. The stream manager 101 is coupled or has access to an operator placement and activities database 105 for storing historical operator placements and historical streaming application runtime metrics. The stream computing environment 10 further includes a plurality of computing nodes, or hosts, 110A-110D. The management system 100 and the plurality of computing nodes 110A-110D communicate over a communications network 120. The communications network 120 may include one or more servers, networks, or databases, and may use a particular communication protocol to transfer data between the computing nodes 110A-110D. Referring to FIGS. 2 and 3, the management system 100 may be implemented in the management layer 80. Customers of the stream computing service write streaming applications by defining an operator graph 104, which is compiled and submitted to the management system 100. The stream manager 101 provisions the resources required by the streaming application in the virtualization layer 70 and the hardware and software layer 60. The scheduler 102 of the stream manager 101 places the operators in the operator graph 104 on one or more computing nodes 110A-110D.

Figure 4:
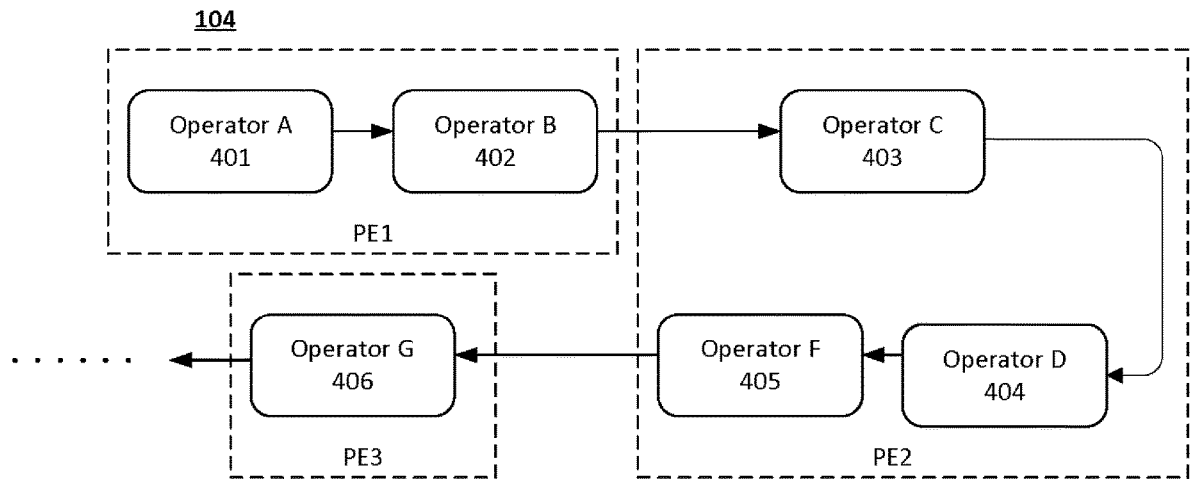
FIG. 4 illustrates a simple example of the operator graph according to some embodiments.
Figure 5:
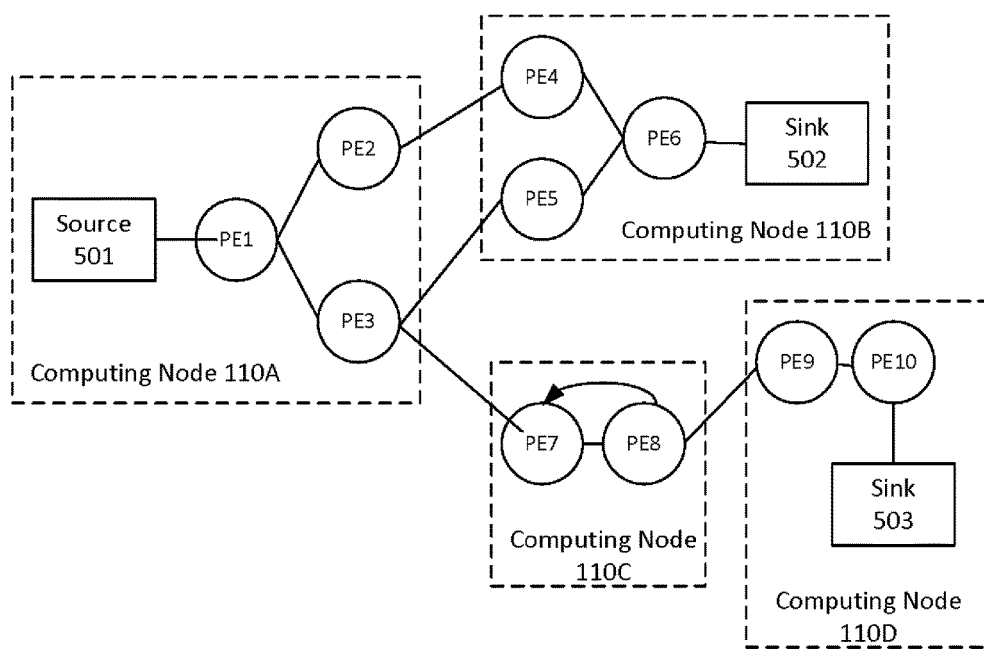
FIG. 5 illustrates an example configuration of processing elements according to some embodiments.

FIG. 4 illustrates a simple example of the operator graph 104 according to some embodiments. The example operator graph 104 includes six operators A-G (401-404). Each operator 401-404 receives data, referred to as "tuples", and applies analytic logic to the tuples. The operator may change the tuple by adding or subtracting attributes or updating the values of existing attributes within the tuple. When the analytic logic is complete, a new tuple is sent to the next operator. When the operator graph 104 of a streaming application is submitted to the stream manager 101, the scheduler 102 places the operators on computing nodes 110A-110D. The scheduler 102 may combine, or "fuse", multiple operators together to form a processing element (PE). As illustrated in FIG. 4, operators A and B (401-402) are fused into processing element PE1, operators C, D, and F (403-405) are fused into processing element PE2, and operator G (406) is alone in processing element PE3. To achieve scalability and performance, the scheduler 102 may distribute the processing elements, PE1-PE3, across multiple computing nodes 110A-110D. As illustrated in FIG. 5, the streaming application begins from a source 501 and ends at one or more sinks 502-503. Computing node 110A includes processing elements PE1, PE2, and PE3. Tuples from the source 501 flows into the processing element PE1 and are processed by the operators 401-402 contained in processing element PE1. The tuples are output by processing element PE1 to processing elements PE2 and PE3. Tuples output by processing element PE2 flow to processing element PE4 on computing node 110B, and tuples output by processing element PE3 flow to processing element PE5 on computing node 110B and processing element PE7 on computing node 110C. Tuples output by processing elements PE4 and PE5 flow to operators in a sink PE6. Similarly, tuples flow from processing element PE7 to processing element PE8 on computing node 110C. Tuples output from processing element PE8 flow to processing element PE9 on computing node 110D, which in turn outputs tuples to be processed by operators in a sink processing element, for example PE10.

Figure 6:
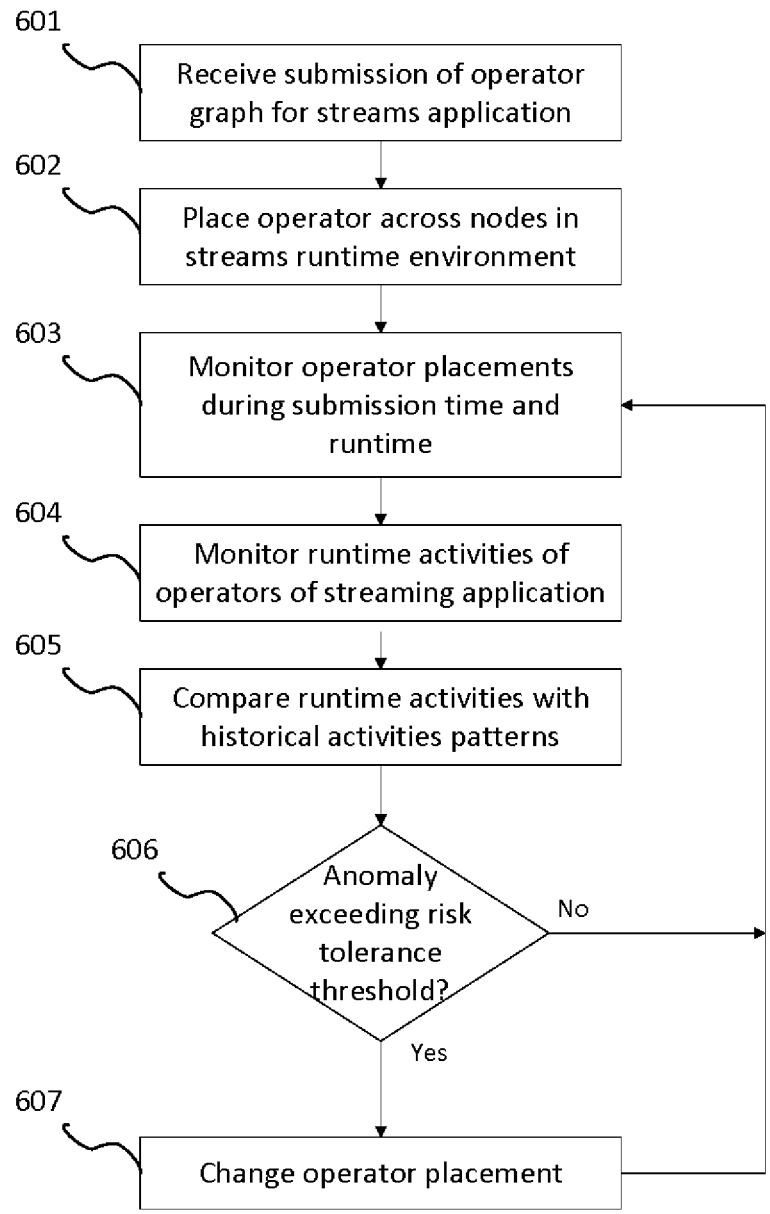
FIG. 6 illustrates an exemplary method for monitoring operator placement according to some embodiments.

In addition to performance considerations in operator placement, the threat detector 103 further monitors for patterns in operator placement that indicate a potential security threat in the distributed or cloud computing environment 10. FIG. 6 illustrates an exemplary method for monitoring operator placement according to some embodiments. Upon receiving the submission of an operator graph 104 for a streaming application by the management system 100 (601), the scheduler 102 of the stream manager 101 configures the placement of the operators in the stream runtime environment 10, including which operators to fuse into the same PE and which operator and/or PE is hosted on which computing node 110A-110D (602). During submission time, the threat detector 103 of the stream manager 101 monitors the operator placements in the stream runtime environment 10 (603). Optionally, certain operators may be tagged with a configurable security risk level, such as due to the sensitive data type the operator is configured to process. Based on the tags, certain operator placements or combinations of placements may be disallowed due to the security risk. The threat detector 103 informs the scheduler 102 of the risk, and the scheduler 102 may respond by changing the operator placement of these operators accordingly. For example, an operator which performs network sniffing or monitors packets on a network may be tagged with a high security risk level. These operators may be configured to disallow placement where the operator may inadvertently (or purposefully) "listen in" on traffic for another streaming application. Accordingly, the scheduler 102 places these operators on nodes not shared with other streaming applications.

The threat detector 103 also monitors the runtime activities of the operators of the streaming application (604). Example runtime activities include, but are not limited to, the following: operator performance data; congestion metadata; system resources used (such as memory, CPU, disk access, etc.); patterns in streaming application code execution; and events that cause changes in the operator placements (such as the movement of operators from one process to another when the stream application restarts, which can occur on a different host). The threat detector 103 compares the runtime activities with activities patterns stored in the database 105 (605). The comparison with stored activities patterns may include comparing patterns in code execution and data processing, e.g. types of data input, whether a code path historically executes continuously, number of tuples processed, rate of processing, etc. Previous run patterns established for the streaming application, stored in the database 105, may be compared with the runtime activities. For previously unrun code in an operator, anomaly behavior not previously observed for the operator or similar types of operators may be captured by the threat detector 103 (e.g., extensive CPU utilization, opening of ports, heavy network traffic, etc.) Based on the comparison, the threat detector 103 may inform the scheduler 102 of any anomalies in the streaming application execution. The scheduler 102 may respond by altering the operator placements to be consistent with the previous run patterns. Additional activities may be user defined and tracked in developing a behavioral profile of an operator. For example, operators may be monitored to determine what data the operator dynamically loads, which can aid the threat detector 103 in identifying operators seeking vulnerable libraries already deployed. This operator's metrics can then be compared with the known behavioral profile. A multivariant analysis may be performed based on deviations from an expected behavior or an operator, deviations from normal streaming application execution patterns, suspicious system calls, etc. When an anomaly is identified, the threat detector 103 determines whether the anomaly exceeds a risk tolerance threshold (606). The risk tolerance threshold for the streaming application may be set by an administrator. For example, a streaming application running in a single tenant environment may be considered a low risk streaming application. The risk tolerance threshold for this streaming application may be set high. In contrast, a low risk tolerance threshold may be set for a streaming application running in a multi-tenant environment, e.g. in a public cloud environment, such that when anomalies are identified, the risk tolerance threshold would be more easily exceeded. When the anomaly exceeds the risk tolerance threshold, the threat detector 103 informs the scheduler 102, which responds by changing an operator placement to reduce the risk (607). For example, if the operator is fused with other operators in a processing element, then the scheduler 102 unfuses the operator and places the operator in its own processing element or moves the operator to be fused with different operators on another processing element in order to reduce the risks. The scheduler 102 may also isolate the operator on a different computing node. Optionally, the threat detector 103 sends an alert or notification to a system administrator or a monitoring tool, which then changes the operator placements. Optionally, when the runtime behavior of the streaming application returns to normal, i.e., returns to a level below the risk tolerance threshold, the operator may be returned to its original placement.

The operator placement changes may be performed dynamically, without stopping or pausing the execution of the stream application. The operator placements and activities collected by the threat detector 103 may be added to the database 105 for use in future comparisons. Any operators moved or unfused in response to activities exceeding a risk tolerance threshold may be stored in the database 105 and marked as suspicious along with the operator's profile data. The data stored in the database 105 may also be used for forensic investigation. The information in the database 105 may further be used to aid developers and administrators in proper operator placement, such as by alerting the developer or administrator of the risk level of the operator based on historical activities or of operator placement configurations that are allowed or disallowed. The information in the database 105 may further be used to create profiles of the developers or administrators, based on the resulting anomalies that occur based on their operator placements. The information in the database 105 may further trigger additional monitoring of programmers, administrators, etc., including by creating a "honeypot" of operators and processing elements specifically designed to attract, identify, and/or distract malicious actors.

Figure 7A:
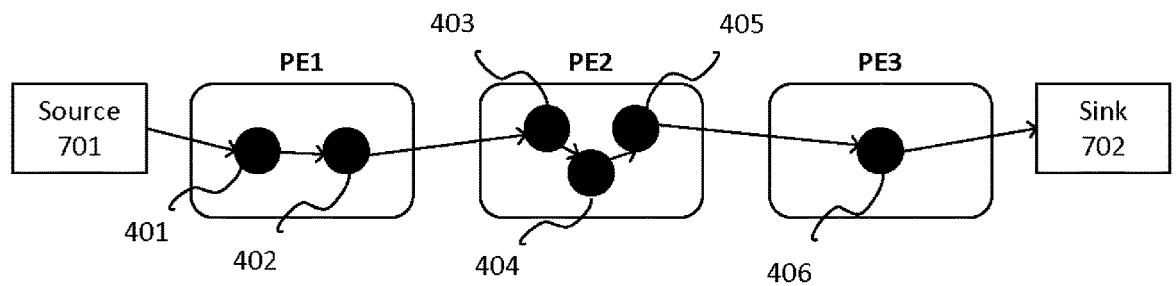
FIGS. 7A and 7B illustrate an example of the prevention of malicious operator placements according to some embodiments.
Figure 7B:
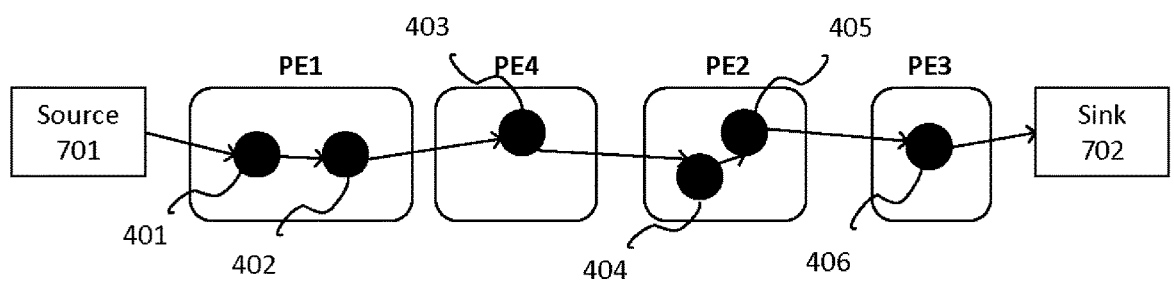

FIGS. 7A and 7B illustrate an example of the prevention of malicious operator placements according to some embodiments. FIG. 7A illustrates a streaming application comprising processing elements PE1, PE2, and PE3. Processing element PE1 contains two operators 401-402. Processing element PE2 contains three operators 403-405. Processing element PE3 contains one operator 406. Processing element PE1 has one source operator, and processing element PE3 has one sink operator. Assume that a risk tolerance threshold is set at the instance or domain level. The higher the risk tolerance threshold, the less likely the threat detector 103 will interfere with the operator placement decisions of the scheduler 102. Referring also to FIG. 6, the management system 100 receives the submission of an operator graph 104 for a streaming application (601). The scheduler 102 places the operators in processing elements PE1-PE3, as illustrated, across the nodes in the stream runtime environment 10 (602). During submission time and during runtime, the threat detector 103 monitors the operator placements (603). The threat detector 103 monitors the runtime activities of the streaming application (604). The threat detector 103 identifies previous run patterns established for the streaming application from the database 105 and compares the runtime activities with the previous run patterns (605). Assume in this example that an operator 403 in processing element PE2 begins to act sporadically and causes the risk tolerance threshold to be exceeded (606). As illustrated in FIG. 7B, upon being informed by the threat detector 103, the scheduler 102 changes the operator placements by unfusing the operator 403 from processing element PE2 and isolating the operator 403 in a new processing element PE4 (607). The processing element PE4 may be placed on a different node from the processing elements PE1-PE3 to further isolate the operator 403. This operator's pattern during its sporadic behavior may be added to the database 105 and tagged as "bad" or "malware" to aid in future comparisons.

Figure 8:
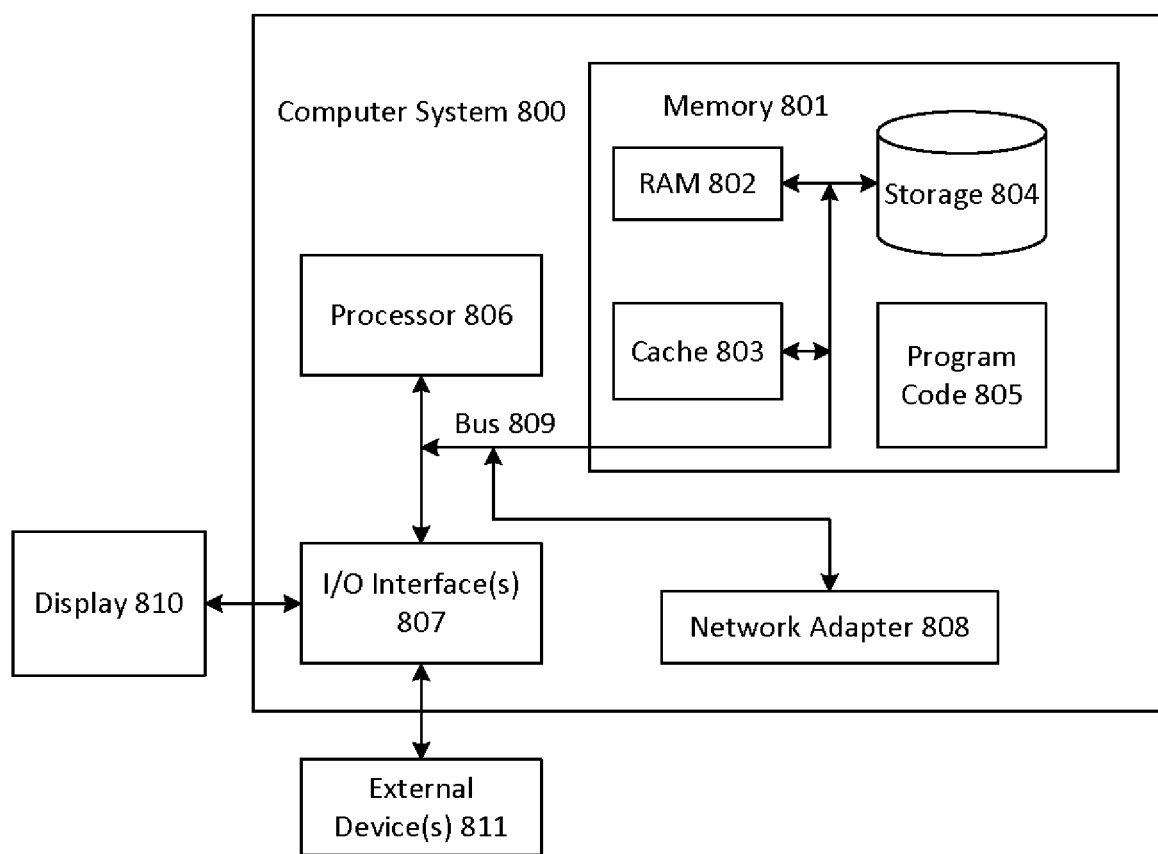
FIG. 8 illustrates a computer system, one or more of which implements the stream runtime environment according to embodiments of the present invention.

FIG. 8 illustrates a computer system, one or more of which implements the stream runtime environment 10 according to embodiments of the present invention. The computer system 800 is operationally coupled to a processor or processing units 806, a memory 801, and a bus 8709 that couples various system components, including the memory 801 to the processor 806. The bus 809 represents one or more of any of several types of bus structure, including a memory bus or memory controller, a peripheral bus, an accelerated graphics port, and a processor or local bus using any of a variety of bus architectures. The memory 801 may include computer readable media in the form of volatile memory, such as random access memory (RAM) 102 or cache memory 803, or non-volatile storage media 804. The memory 801 may include at least one program product having a set of at least one program code module 805 that are configured to carry out the functions of embodiment of the present invention when executed by the processor 806. The computer system 800 may also communicate with one or more external devices 811, such as a display 810, via I/O interfaces 807. The computer system 800 may communicate with one or more networks via network adapter 808.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method for preventing malicious operator placement in a streaming application, comprising:
   receiving, by a stream computing management system, a submission of an operator graph for the streaming application, the operator graph comprising a plurality of operators;
   placing, by a scheduler of the stream computing management system, the plurality of operators across a plurality of computing nodes;
   monitoring, by a threat detector of the stream computing management system, placements of the plurality of operators during the submission of the operator graph and a runtime of the streaming application;
   monitoring, by the threat detector, runtime activities of the plurality of operators of the streaming application;
   comparing, by the threat detector, the runtime activities of the plurality of operators of the streaming application with stored activities patterns;
   determining, by the threat detector, whether any anomalies identified based on the comparing exceeds a risk tolerance threshold; and
   in response to determining that an anomaly identified based on the comparing exceeds the risk tolerance threshold, changing, by the scheduler, a placement of at least one operator of the plurality of operators.

2. The method of claim 1, wherein one or more operators of the plurality of operators is tagged with a security risk level, wherein the monitoring of the placements of the plurality of operators during the submission of the operator graph comprises:
   based on the security risk levels of the one or more operators, disallowing, by the scheduler, a given operator placement or a given combination of operator placements.

3. The method of claim 1, wherein the anomaly is selected from a group consisting of: a deviation from an expected behavior of a given operator of the plurality of operators; a deviation from a normal execution pattern of the streaming application; and suspicious system calls.

4. The method of claim 1, wherein the streaming application is executing in a multi-tenant stream computing environment, wherein the risk tolerance threshold for the streaming application is set higher than if the streaming application is executing in a single-tenant stream computing environment.

5. The method of claim 1, wherein the changing of the placement of the at least one operator of the plurality of operators comprises:
   unfusing, by the scheduler, the at least one operator from a processing element; and
   isolating, by the scheduler, the at least one operator in a new processing element or on a different computing node of the plurality of computing nodes.

6. The method of claim 1, further comprising:
   sending, by the threat detector, an alert of the anomaly to a system administrator.

7. A computer program product for preventing malicious operator placement in a streaming application, the computer program product comprising a computer readable storage medium having program instructions embodied therewith, the program instructions executable by a processor to cause the processor to:
   receive a submission of an operator graph for the streaming application, the operator graph comprising a plurality of operators;
   place the plurality of operators across a plurality of computing nodes;
   monitor placements of the plurality of operators during the submission of the operator graph and a runtime of the streaming application;
   monitor runtime activities of the plurality of operators of the streaming application;
   compare the runtime activities of the plurality of operators of the streaming application with stored activities patterns;
   determine whether any anomalies identified based on the comparing exceeds a risk tolerance threshold; and
   in response to determining that an anomaly identified based on the comparing exceeds the risk tolerance threshold, change a placement of at least one operator of the plurality of operators.

8. The computer program product of claim 7, wherein one or more operators of the plurality of operators is tagged with a security risk level, wherein the monitoring of the placements of the plurality of operators during the submission of the operator graph comprises:
   based on the security risk levels of the one or more operators, disallow a given operator placement or a given combination of operator placements.

9. The computer program product of claim 7, wherein the anomaly is selected from a group consisting of: a deviation from an expected behavior of a given operator of the plurality of operators; a deviation from a normal execution pattern of the streaming application; and suspicious system calls.

10. The computer program product of claim 7, wherein the streaming application is executing in a multi-tenant stream computing environment, wherein the risk tolerance threshold for the streaming application is set higher than if the streaming application is executing in a single-tenant stream computing environment.

11. The computer program product of claim 7, wherein the changing of the placement of the at least one operator of the plurality of operators comprises:
   unfuse the at least one operator from a processing element; and
   isolate the at least one operator in a new processing element or on a different computing node of the plurality of computing nodes.

12. The computer program product of claim 7, further comprising:
   send an alert of the anomaly to a system administrator.

13. A stream computing management system comprising:
   a processor; and
   a computer readable storage medium having program instructions embodied therewith, the program instructions executable by the processor to cause the processor to:
   receive a submission of an operator graph for the streaming application, the operator graph comprising a plurality of operators;
   place the plurality of operators across a plurality of computing nodes;
   monitor placements of the plurality of operators during the submission of the operator graph and a runtime of the streaming application;
   monitor runtime activities of the plurality of operators of the streaming application;
   compare the runtime activities of the plurality of operators of the streaming application with stored activities patterns;
   determine whether any anomalies identified based on the comparing exceeds a risk tolerance threshold; and
   in response to determining that an anomaly identified based on the comparing exceeds the risk tolerance threshold, change a placement of at least one operator of the plurality of operators.

14. The system of claim 13, wherein one or more operators of the plurality of operators is tagged with a security risk level, wherein the monitoring of the placements of the plurality of operators during the submission of the operator graph comprises:
   based on the security risk levels of the one or more operators, disallow a given operator placement or a given combination of operator placements.

15. The system of claim 13, wherein the anomaly is selected from a group consisting of: a deviation from an expected behavior of a given operator of the plurality of operators; a deviation from a normal execution pattern of the streaming application; and suspicious system calls.

16. The system of claim 13, wherein the streaming application is executing in a multi-tenant stream computing environment, wherein the risk tolerance threshold for the streaming application is set higher than if the streaming application is executing in a single-tenant stream computing environment.

17. The system of claim 13, wherein the changing of the placement of the at least one operator of the plurality of operators comprises:
   unfuse the at least one operator from a processing element; and
   isolate the at least one operator in a new processing element or on a different computing node of the plurality of computing nodes.

18. The system of claim 13, further comprising:
   send an alert of the anomaly to a system administrator.

* * * * *